(12) United States Patent
Walthert et al.

(10) Patent No.: US 8,967,732 B2
(45) Date of Patent: Mar. 3, 2015

(54) RIM OF A FIBROUS COMPOSITE MATERIAL FOR AT LEAST PARTIALLY MUSCLE-POWERED BICYCLES

(75) Inventors: Martin Walthert, Aarberg (CH); Martin Fischer, Luterbach (CH); Andreas Tschanz, Gerzensee (CH)

(73) Assignee: DT Swiss Inc., Grand Junction, CO (US)

( * ) Notice: Subject to any disclaimer, the term of this patent is extended or adjusted under 35 U.S.C. 154(b) by 480 days.

(21) Appl. No.: 13/324,748

(22) Filed: Dec. 13, 2011

(65) Prior Publication Data

US 2012/0153709 A1    Jun. 21, 2012

(30) Foreign Application Priority Data

Dec. 15, 2010    (DE) .......................... 10 2010 054 657

(51) Int. Cl.
*B60B 21/08*    (2006.01)
*B60B 5/02*    (2006.01)
*B60B 21/02*    (2006.01)

(52) U.S. Cl.
CPC .................. *B60B 5/02* (2013.01); *B60B 21/025* (2013.01); *B60Y 2200/13* (2013.01)
USPC ............. 301/95.108; 301/95.107; 301/95.104

(58) Field of Classification Search
USPC ............. 301/95.101–95.104, 95.107–95.108
See application file for complete search history.

(56) References Cited

U.S. PATENT DOCUMENTS

| 8,313,155 | B2* | 11/2012 | Schiers ................... 301/95.107 |
| 8,342,614 | B2* | 1/2013 | Poertner et al. .......... 301/95.107 |
| 2008/0296961 | A1 | 12/2008 | Dal Pra' | |
| 2009/0115240 | A1* | 5/2009 | Slate et al. .............. 301/95.104 |
| 2009/0250994 | A1 | 10/2009 | Meggiolan | |
| 2009/0250995 | A1* | 10/2009 | Tsai ......................... 301/95.108 |
| 2010/0301664 | A1* | 12/2010 | Cheng ..................... 301/95.102 |
| 2010/0320831 | A1* | 12/2010 | Su ............................ 301/95.103 |

FOREIGN PATENT DOCUMENTS

| EP | 1985435 | 10/2008 |
| EP | 1985466 | 10/2008 |
| WO | WO 2010/141350 | 12/2010 |

OTHER PUBLICATIONS

German Office Action from the German Patent Office in the corresponding priority application 10 2010 054 657.7.

* cited by examiner

*Primary Examiner* — Jason Bellinger
(74) *Attorney, Agent, or Firm* — Greer, Burns & Crain, Ltd.

(57) ABSTRACT

A rim for a bicycle having a rim body including a rim well and a rim base and rim flanks connecting the rim base and the rim well wherein the rim flanks and the rim base consist of a fibrous composite material. A minimum wall thickness of the rim flanks is thinner in one radial region than in another radial region. The rim body is bulbous in cross-section. A maximum height from the rim base to the rim well is less than 1.5 times and in particular less than 1.2 times the maximum width.

12 Claims, 2 Drawing Sheets

RIM OF A FIBROUS COMPOSITE MATERIAL FOR AT LEAST PARTIALLY MUSCLE-POWERED BICYCLES

BACKGROUND

The present invention relates to a rim consisting at least in part of at least one fibrous composite material and being provided for at least partially muscle-powered two-wheeled vehicles and in particular for bicycles. While the rim according to the invention can be and is in particular being employed in conventional bicycles, it may in particular be employed in electro-assisted bicycles for proportionally assisting the rider in riding.

A wide variety of rims have become known in the prior art which for saving weight may partially or entirely consist of a fibrous composite material.

Fibrous composite rims have a low weight combined with high strength. What is a drawback is the high rigidity of the fibrous composite rims such that for example in bicycle races where the riders must ride on cobblestones over long stretches, many racers tend to not use carbon fiber or other fibrous composite rims since a certain risk of breakage is involved with such vibrating loads. Use in mountain bikes when riding on dirt roads, single trails, woodways, steps or the like may in adverse circumstances show negative effects of the high rigidity and increased risk of breakage of fibrous composite rims.

It is therefore the object of the present invention to provide a rim which consists at least in part of a fibrous composite material and which shows increased durability even under vibrating loads.

SUMMARY

A rim according to the invention is provided for at least partially muscle-powered two-wheeled vehicles and in particular for bicycles and comprises a rim body. The rim body comprises a rim well and a rim base and rim flanks connecting the rim base with the rim well. The rim flanks and the rim base consist at least in part of a fibrous composite material. A minimum wall thickness of the rim flanks is thinner in one radial region than in another radial region. The rim body is bulbous in cross-section. A maximum height from the rim base to the rim well is less than 1.5 times and in particular less than 1.2 times the maximum width.

The rim according to the invention has many advantages since it ensures reliable use and high durability. Due to the wall thickness of the rim flanks being lower in a radial region closer to the rim base than in another radial region, a higher rim elasticity is achieved. The thinner wall thickness in one radial region causes lasting stressability of the rim while in the other radial region the higher wall thickness reliably resists to the loads occurring.

The reduction of the wall thickness e.g. in the region of the lower rim flank leads to the required flexibility and to the fact that in the case of high stresses and e.g. bottoming out the rim can yield somewhat thus preventing a tire defect.

The increased wall thickness e.g. in the radially outwardly region of the rim flanks prevents rim breakage in the case of a tire defect or in the case of heavy impacts in the case of bottoming out.

Another advantage is that in the region where stones or the like from the road may hit the rim, the rim is reinforced and can thus be subjected to increased stresses.

Preferably the average wall thickness in a radially first half of at least one rim flank is thinner than the average wall thickness in the radially second half of the rim flank. Preferably the average wall thickness in the second half of at least one rim flank is thicker than the average wall thickness in the first half of the rim flank. In this way high stressability is achieved in one radial region and in the other radial region, high flexibility and elasticity of the rim.

In particular is the average wall thickness in the second radial half at least twice as thick as is the average wall thickness in the first radial half. It is possible and preferred for the maximum wall thickness in the second radial half to show 1.5 times, twice, three or four times the thickness of the minimum wall thickness in the first radial half.

Preferably the wall thickness of a rim flank in the radial region between the rim well and the rim base in the radially outwardly half is higher than a wall thickness in the region of the radially inwardly half.

Preferably a minimum wall thickness of the rim flanks in a region closer to the rim base is thinner than in a region closer to the rim well.

In a particularly preferred more specific embodiment a lateral rim body radius at the transition from the rim well to the rim flank is more than twice and in particular more than three times or five times as large as is the minimum wall thickness of the rim flank. A large radius at the transition from the rim well to the rim flanks reliably prevents destruction of the tube in the case of bottoming out. This allows better operation and more reliability of function of the rim.

Preferably the lowest wall thickness of the rim well may be thicker than the minimum wall thickness of the rim flank. The lowest wall thickness of the rim well may preferably be twice as thick as the minimum wall thickness of the rim flank. This means that the minimum thickness of the rim flank in preferred configurations is considerably thinner than the lowest wall thickness of the rim well. The wall thickness in the radially inwardly region can be distinctly reduced so as to increase flexibility.

Preferably the wall thickness in a transition region from the rim well to the rim flanks is more than twice the lowest wall thickness and/or preferably more than five times thicker than the minimum wall thickness of the rim flanks. This means that in the region of the lateral radius at the transition from the rim well to the rim flanks a particularly high wall thickness is present such that in this place the wall withstands high stresses.

Particularly preferably the rim body is on the whole bulbous in cross-section. A bulbous cross-section achieves high rim elasticity so as to increase stressability in particular in the case of vibrating loads such as for example on cobblestones.

In all of the embodiments it is preferred for the maximum width of the rim body at the rim well to be larger than a maximum width at the rim base. This means that at the level of the rim base the maximum width of the rim body is smaller than a maximum width at the rim well or than the maximum width of the rim body on the whole.

Due to a larger width in the radially outwardly region compared to the radially inwardly region the bulbous shape is more explicit so as to result in increased elasticity and decreased radial stiffness.

What is particularly preferred is a maximum width of the rim body at the rim well of at least 1.5 times and in particular about twice or at least twice as wide as a width of the rim body at the rim well. Advantageously a maximum height from the rim base to the rim well is less than 1.5 times and in particular less than 1.2 times the maximum width of the rim body. The relatively low ratio of rim height to rim width furthers the rim elasticity. Rim dimensions where the height from the rim base to the rim well is less than the width are conceivable as well.

In all of the configurations it is conceivable for rim flanges to be provided for receiving wire tires. What is in particular also preferred are tubeless systems where the tire is for example glued onto the rim well and contains the tube directly.

While such use is possible and preferred for racing bicycles it is likewise possible and also preferred for mountain-bikes.

In preferred embodiments the regions of the rim flanks may be provided at least in part with a different fibrous composite material than the region of the rim well and the rim base. A different fibrous material or a different resin may be used. Or else it is possible and preferred for the employed fiber layers for example to have a different orientation.

Preferably so-called prepregs are employed in manufacturing where woven fiber layers are pre-impregnated with a resin.

It is for example possible to use in the region of the rim flanks a fibrous composite material in which the individual fibers are aligned approximately 45 degrees from the radial direction of the rim. This achieves high elasticity in the radial direction. In other regions of the rim the fibers may for example extend in the peripheral direction of the rim.

Different methods may be employed for manufacturing a rim according to the invention. It is for example possible to employ a method according to EP 1 985 435 B1 or according to EP 1 985 466 B1, wherein the rim may be manufactured with rim flanges or without rim flanges.

BRIEF DESCRIPTION OF THE DRAWINGS

Further advantages and features of the present invention follow from the embodiment which will be explained below with reference to the enclosed figures.

The figures show in.

DETAILED DESCRIPTION

With reference to the enclosed FIGS. 1-4 exemplary embodiments of the rim according to the invention will be discussed which is provided to be used in at least partially muscle-powered two-wheeled vehicles and in particular in bicycles 50.

Figure 1:
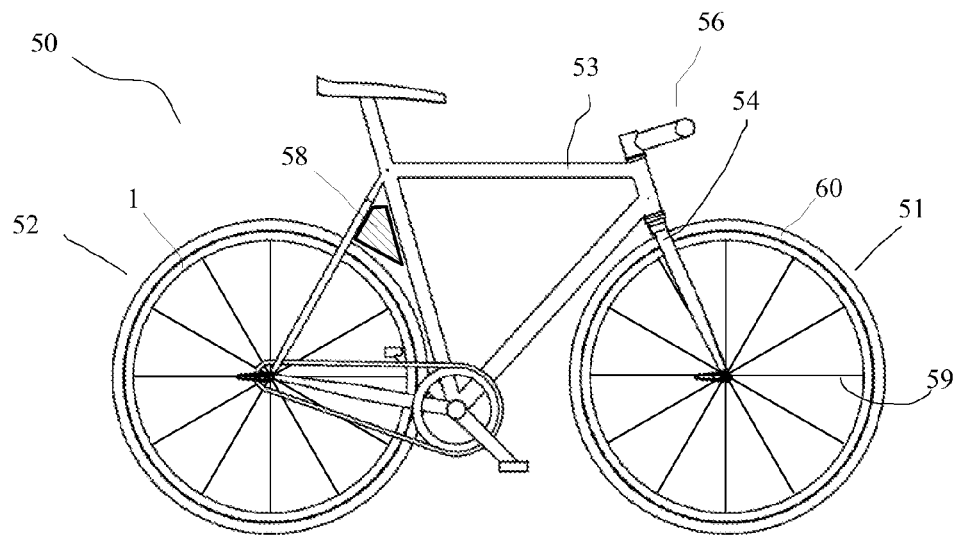
FIG. 1 a schematic side view of a racing bicycle equipped with rims according to the invention.

FIG. 1 illustrates a simplistic view of a bicycle 50 configured as a racing bicycle comprising a front wheel 51, a rear wheel 52 and a frame 53. A handlebar 56 serves as a control and may be configured in different ways. Other than a configuration as a commercial racing handlebar, all of the other known configurations are likewise possible. Beneath the saddle 57 a battery 58 may be provided which is employed in particular for electro-assisted two-wheeled vehicles. Generally speaking, such a battery 58 may be attached to the frame in other positions or incorporated into the frame or attached elsewhere.

In the front wheel 51 and the rear wheel 52 the rims 1 are connected with the hub via spokes 59.

In the bicycle according to FIG. 1 the tire 60 is configured as a tubeless tire and is for example glued onto the rim 1.

Figure 2:
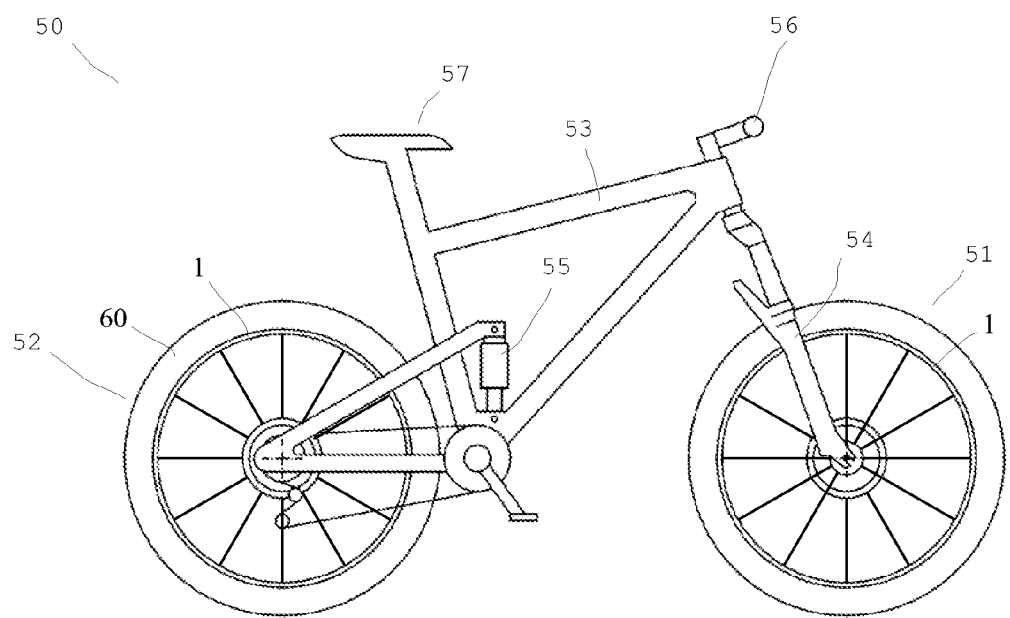
FIG. 2 a schematic side view of a mountain bike equipped with rims according to the invention.

FIG. 2 illustrates in a simplistic side view a mountain bike as a bicycle 50 comprising a front wheel 51 and a rear wheel 52, a frame 53, a sprung front fork 54 and a rear wheel damper 55. In this embodiment disk brakes are provided.

Figure 3:
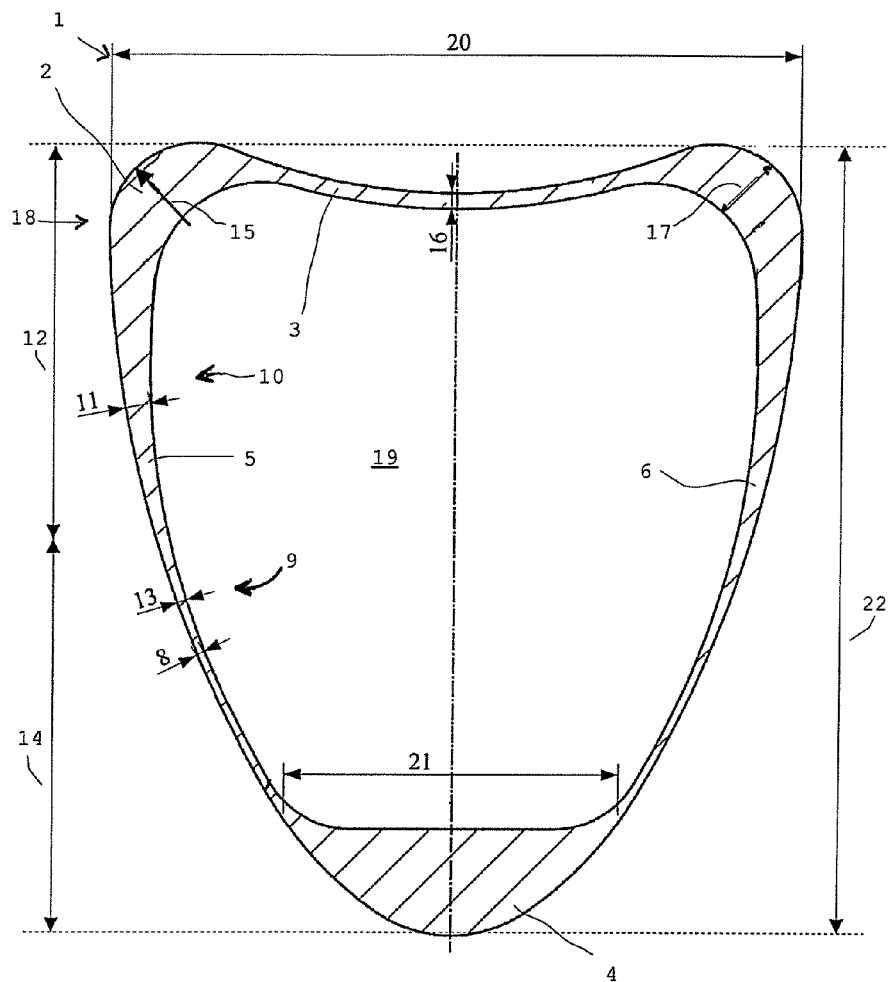
FIG. 3 a simplistic cross-section of a rim according to the invention for use in the bicycles according to FIG. 1 or 2.

FIG. 3 illustrates a cross-section of the rim body 2 of a rim 1 in a schematic form. The rim 1 comprises a rim body 2 comprising a rim well 3, a rim base 4 and a pair of lateral rim flanks 5 and 6 connecting the rim base 4 with the rim base 3. Depending on the configuration the rim base 4 may be configured wider or narrower and optionally form a continuous transition to the lateral rim flanks 5 and 6.

To achieve a high elasticity of the rim 1, the rim 1 is bulbous in shape and has a planned distribution of wall thicknesses.

The rim body 2 consists on the whole of a fibrous composite material. For manufacturing the rim 1, prepregs are preferably employed consisting of woven reinforcing fibers and a resin as the matrix material.

The height of the rim 1 may be divided into a first radial region 9 and a second radial region 10. The minimum wall thickness 8 in the first radial region 9 is smaller than the wall thickness in the second radial region 10. Due to the smaller minimum wall thickness 8 a reduced stiffness in the radial direction is achieved in what is presently the radially inwardly region 9 so as to obtain a more elastic rim 1 and thus higher stressability for example when traveling on cobblestone streets. It is also possible to provide an elastic rim 1 by way of a radially inwardly region of a larger wall thickness and a radially outwardly region of a smaller wall thickness.

Also, in the exemplary embodiment the average wall thickness 13 in the radially inwardly region 9 is distinctly smaller than the average wall thickness 11 in the radially outwardly region 10. In the present exemplary embodiment the height 22 of the rim body 2 can be divided up into two radial halves 12 and 14 wherein the minimum wall thickness 8 in the first radial, which is presently the radially inwardly, half 14 is considerably smaller than the average wall thickness 11 or else the minimum wall thickness in the second radial half which is presently the radially outwardly half 12. In other configurations the radially inwardly half has a larger wall thickness than the radially outwardly half. Then the first radial half is provided further outwardly and the second radial half is disposed further inwardly.

In this way higher rigidity and higher stressability against shocks is achieved in the second radial, presently the outwardly, half 12 while the first radial region leads to both higher elasticity of the rim and a reduced weight of the rim.

The radius 15 at the transition from the rim well 3 to the lateral rim flanks 5 and 6 is distinctly larger than the largest wall thickness of the rim body 2 to ensure a smooth transition from the rim well to the rim flank and thus high stressability of the rim 1 in the case of bottoming out or the like. The maximum wall thickness 17 of the rim body 2 is reached in the transition region 18 and here it is between 3 times and 15 times the minimum wall thickness 8. In a specific configuration the maximum wall thickness of the rim body 2 is just under 5 times or 10 times the minimum wall thickness 8.

The wall thickness 16 in the region of the rim well may be nearly constant over the entire rim well and it is in particular larger than the minimum wall thickness 8 in the region of the rim flanks 5 and 6. The bulbous shape of the cross-section 19 of the rim body 2 shows in particular by the ratio of the maximum width 20 of the rim body at the rim well relative to the maximum width 21 of the rim body at the level of the rim base which in the illustrated example is <1.5 and presently even <2. The bulbous shape is also described by the ratio of the maximum height 22 to the maximum width which may presently be <1.5 and in particular <1 or even beneath.

Figure 4:
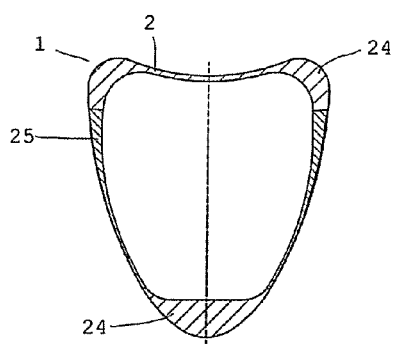
FIG. 4 another simplistic cross-section of a rim according to the invention.

FIG. 4 shows a modified embodiment of a rim 1 wherein additionally to the geometrical relationships two different fibrous composite materials are used which differ at least in one of their properties.

On the whole it is preferred in all of the embodiments to manufacture the entire rim body of fibrous composite materials.

It is conceivable to manufacture in the region from the first fibrous composite material the rim body 2 and/or in the region of the rim well 3 and optionally the rim base 4 while another fibrous composite material 25 is employed for manufacturing other rim flanks 5 and 6. The two fibrous composite materials 24 and 25 differ at least in one of their properties.

It is also possible to use different reinforcing fibers such as carbon or aramidic fibers; it is also possible to use fiber layers showing different weaves. It is also possible for the orientation of the fibers relative to the rim body 2 to vary in the different regions. For example in the region of the rim well and the rim base some or considerable portions of the fibers may be aligned in the peripheral direction of the rim while in the region of the rim flanks 5 and 6 the fibers are aligned at an angle of e.g. 45° to the peripheral direction of the rim body 2.

On the whole the rim 1 according to the invention provides a rim leading to increased durability in the case of vibrating shocks such as e.g. on cobblestone streets. In terrain increased durability can be achieved as well.

| List of reference numerals: | |
|---|---|
| 1 | rim |
| 2 | rim body |
| 3 | rim well |
| 4 | rim base |
| 5 | rim flank |
| 6 | rim flank |
| 7 | fibrous composite material |
| 8 | minimum wall thickness |
| 9 | first region |
| 10 | second region |
| 11 | average wall thickness radially outwardly |
| 12 | second radial half |
| 13 | average wall thickness radially inwardly |
| 14 | first radial half |
| 15 | lateral radius |
| 16 | lowest wall thickness of the rim well |
| 17 | wall thickness in the transition region |
| 18 | transition region |
| 19 | cross-section |
| 20 | maximum rim body width at the rim well |
| 21 | maximum width at the rim base |
| 22 | maximum height from rim base to rim well |
| 23 | maximum inwardly width |
| 24 | first material |
| 25 | second material |
| 50 | bicycle |
| 51 | front wheel |
| 52 | rear wheel |
| 53 | frame |
| 54 | fork |
| 55 | rear wheel damper |

| List of reference numerals: | |
|---|---|
| 56 | handlebar |
| 57 | saddle |
| 58 | battery |
| 59 | spoke |
| 60 | tire |

The invention claimed is:

1. A rim for bicycles, comprising: a rim body having a rim well and a rim base and rim flanks connecting the rim base and the rim well, wherein said rim flanks have a thickness that gets progressively thinner from a top end to a bottom end of said rim body, at least the rim flanks and the rim base consist of at least one fibrous composite material, a minimum wall thickness of the rim flanks in a radial region is thinner than in another region, and that the rim body is bulbous in cross-section wherein a maximum height from the rim base to the rim well is smaller than 1.5 times the maximum width.

2. The rim according to claim 1, wherein the average wall thickness in a second radial half of at least one of the rim flanks is thicker than the average wall thickness in the first radial half.

3. The rim according to claim 2, wherein the average wall thickness in the second radial half has at least twice the thickness of the average wall thickness in the first radial half.

4. The rim according to claim 2, wherein a wall thickness in the second radial half from the rim well radially towards the first half is greater than a wall thickness in the region of the first radial half.

5. The rim according to claim 1, wherein a lateral radius in a transition region from the rim well to the rim flanks is more than three to five times the minimum wall thickness of the rim flanks.

6. The rim according to claim 1, wherein a lowest wall thickness of the rim well is thicker than a minimum wall thickness of the rim flanks, wherein a thinnest wall thickness of the rim well has at least 1.5 times the minimum wall thickness of the rim flanks.

7. The rim according to claim 5, wherein the wall thickness in the transition region from the rim well to the rim flanks has more than twice the smallest wall thickness of the rim well and more than four times the minimum wall thickness of the rim flanks.

8. The rim according to claim 1, wherein a maximum width of the rim body at the rim well is larger than a maximum width at the rim base.

9. The rim according to claim 1, wherein a maximum width of the rim body at the rim well is at least twice the width of the rim body at the rim well.

10. The rim according to claim 1, wherein in at least part of the regions of the rim flanks, a fibrous composite material is provided that is different from that in the regions of the rim well and the rim base.

11. The rim according to claim 1, wherein a minimum wall thickness in the radial region closer to the rim base is thinner than in the another region closer to the rim well.

12. The rim according to claim 2, wherein the first radial half is disposed radially inwardly and the second radial half is disposed radially outwardly.

* * * * *